United States Patent [19]
Murakami et al.

[11] Patent Number: 5,821,998
[45] Date of Patent: Oct. 13, 1998

[54] METHOD AND APPARATUS FOR PRODUCING AN IMAGE SIGNAL WITH AN IMPROVED S/N RATIO

[75] Inventors: Shinichi Murakami; Yukio Taniji, both of Tokyo, Japan

[73] Assignee: NEC Corporation, Tokyo, Japan

[21] Appl. No.: 521,756

[22] Filed: Aug. 31, 1995

[30] Foreign Application Priority Data

Aug. 31, 1994 [JP] Japan .................................. 6-206459

[51] Int. Cl.⁶ .................................................. H04N 5/217
[52] U.S. Cl. ................................................ 348/241; 348/300
[58] Field of Search ................................. 348/241, 243, 348/248, 249, 250, 207, 607, 300, 294, 316; H04N 5/335, 5/217

[56] References Cited

U.S. PATENT DOCUMENTS

| | | | |
|---|---|---|---|
| 4,556,910 | 12/1985 | Tisue | 348/241 |
| 4,941,052 | 7/1990 | Ohbo . | |
| 5,113,263 | 5/1992 | Audaire et al. | 348/303 |
| 5,382,975 | 1/1995 | Sakai et al. | 348/241 |
| 5,493,423 | 2/1996 | Hoisier | 348/241 |

FOREIGN PATENT DOCUMENTS

| | | | |
|---|---|---|---|
| 1-208975 | 8/1989 | Japan | H04N 5/335 |
| 4-360473 | 12/1992 | Japan | H04N 5/243 |

Primary Examiner—Andrew I. Faile
Assistant Examiner—Tuan V. Ho
Attorney, Agent, or Firm—Foley & Lardner

[57] ABSTRACT

A solid state image pick-up device includes a signal generating unit for generating a reset signal and a transfer signal, a charge detecting section having a capacitor for storing a charge, a charge transfer section for outputting charges of n pixels (n is a positive integer more than 1) to the capacitor of the charge detecting section at a time in response to the transfer signal, a reset unit connected to the capacitor, for ejecting the charge from the capacitor of the charge detecting section in response to the reset signal, and an output amplifier unit for producing an output signal in response to the charges inputted from the charge transfer section to the capacitor of the charge detecting section.

12 Claims, 5 Drawing Sheets

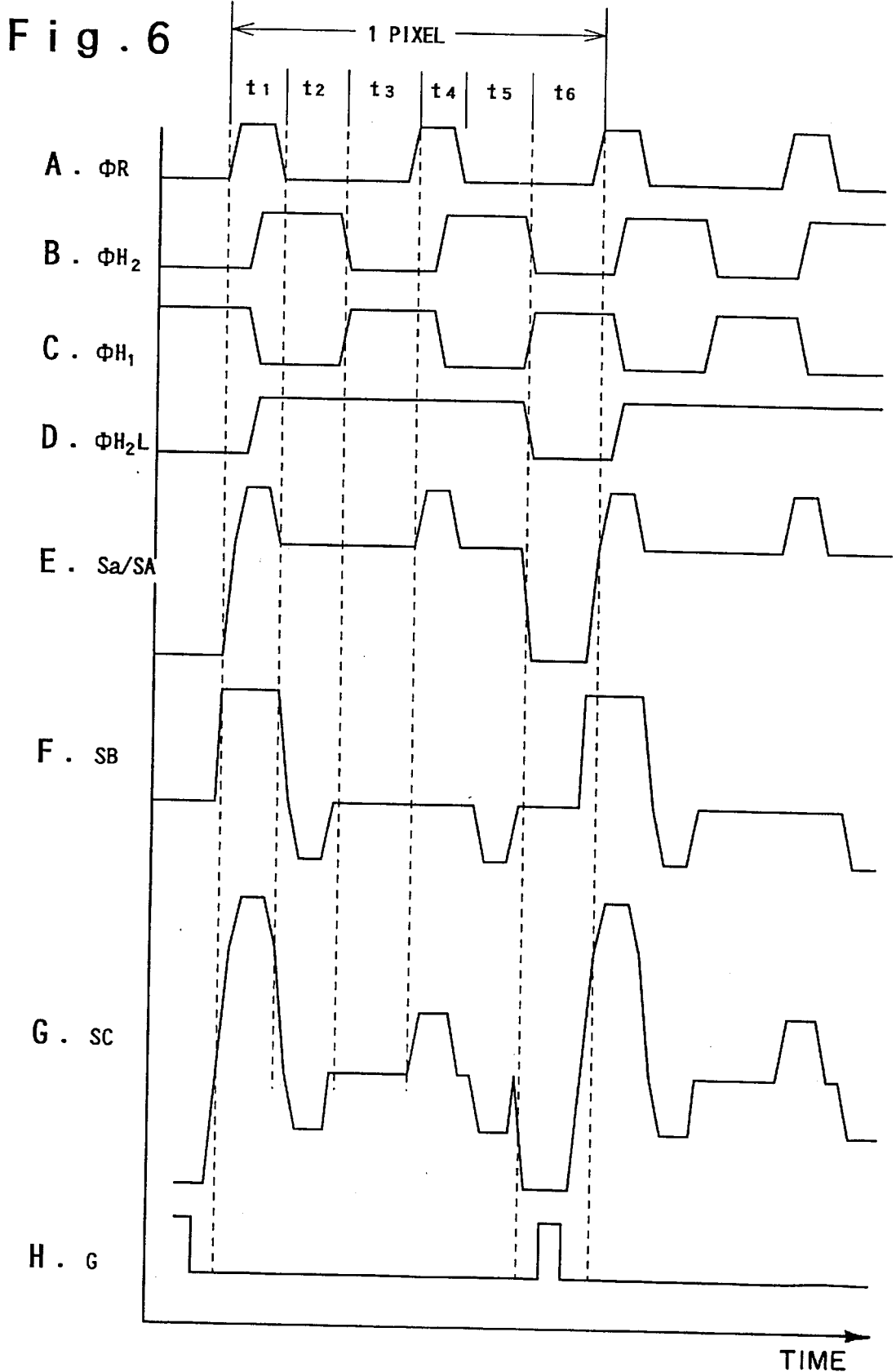

METHOD AND APPARATUS FOR PRODUCING AN IMAGE SIGNAL WITH AN IMPROVED S/N RATIO

BACKGROUND OF THE INVENTION

1. Field of the Invention

The present invention relates to a solid state image pick-up device, and more particularly, to a solid state image pick-up device capable of accomplishing a high S/N ratio under low illumination.

2. Description of Related Art

The recent progress of semiconductor technology in a solid state image pick-up device such as a charge coupled device (CCD) has developed to have a higher resolution and is used widely in the field when a high quality of image is required, such as a camera for broadcasting. On the other hand, the amount of signal charge per one pixel is decreased because of the down sizing of a chip and high integration required for the high resolution image. As a result, the low noise operation is required for the reservation of a dynamic range and sensitivity. For this purpose, there have been made many proposals.

As the technique for reducing noise generated in an output amplifier of a CCD to improve the sensitivity, for instance, a correlated double sampling circuit is disclosed in Japanese Laid Open Patent disclosure (JP-A-Heisei4-360473). In the reference, an output signal is sampled by two sampling & holding circuits and the sampled signals are subtracted from each other by a subtracting circuit in order to improve an S/N ratio in a signal charge interval.

Further, there is proposed a delay difference detecting type of noise reducing circuit in which an output signal of a CCD is received by a buffer circuit to be divided into two signals, one of which is passed through a delay circuit, a voltage difference between the delayed signal and the other signal, i.e., a voltage difference between a signal interval and a feed-through interval is detected by a differential amplifier.

In addition, there is proposed a reflection delay difference type of noise reducing circuit disclosed in Japanese Laid Open Patent Disclosure (JP-A-Heisei1-208975) as an improved version of the above delay difference type of noise reducing circuit. That is, in the reflection delay difference type of noise reducing circuit, the differential amplifier degrading a gain characteristic is removed from the delay difference type of noise reducing circuit. The output signal from the CCD is received by the buffer circuit to be supplied to a delay circuit whose end point is grounded, and an incident signal to the delay circuit and a reflection signal are differentially summed to detect the voltage difference between the signal interval and the feed-through interval.

FIG. 1 is a block diagram of a first conventional solid state image pick-up device which includes the above reflection delay difference type of noise reducing circuit. Referring to FIG. 1, this image pick-up device includes a CCD section 101, a drive circuit 102 for generating signals $\phi H_1$ and $\phi H_2$ as a part of a transfer signal to drive the CCD section 101, a buffer circuit 103 for receiving the output signal Sa from the CCD section 101 to produce a signal SA, a delay circuit or delay line 104 having one of terminals connected to the buffer circuit 103 and the other terminal (an end terminal) connected to the ground potential, an emitter follower circuit 105 for receiving a summing signal Sc of an incident signal A to the delay circuit 4 and a reflection signal B from the delay circuit 104, a gate circuit 106 for determining a voltage difference between a signal charge interval and a feed-through interval of the output signal from the emitter follower circuit 105, and a pulse generating circuit 107 for supplying a sampling pulse signal to the gate circuit 106.

FIG. 2 is a block diagram of the CCD section 101 shown in FIG. 1. The CCD section 101 includes a plurality of light receiving sections (not shown) arranged in a matrix manner, a plurality of vertical transfer sections (not shown) each provided for a column of the light receiving sections, and a horizontal transfer section 111 for receiving the charges from light receiving section as pixels through the vertical transfer sections to transfer the charges toward the buffer circuit 103 shown in FIG. 1 in response to the transfer signal $\phi H_1$ and $\phi H_2$. The horizontal transfer section 111 is constructed so that two electrodes are alternately arranged and supplied with the transfer signal $\phi H_1$ and $\phi H_2$. Each electrode forms a potential well in response to a high level of the signal $\phi H_1$ or $\phi H_2$ to store charge and ejects the stored charge in response to a low level of the signal $\phi H_1$ or $\phi H_2$. The horizontal transfer section 111 further includes an output gate 112 which is connected to the end one of the alternately arranged electrodes supplied with the signal $\phi H_2$. The CCD section 101 further includes a charge detecting section or floating diffusion layer 113 having a capacitor $C_{FJ}$ which stores a charge transferred from the horizontal transfer section 111, and a reset transistor 114 for ejecting the charge stored in the charge detecting section 113 to a reset drain terminal 115 in response to a reset signal $\phi R$ supplied to the gate of the transistor through a reset signal terminal. An output amplifier 116 detects the potential of charge detecting section 113 to produce the output signal Sa in accordance with the detecting result. Also, the output amplifier 116 sets the potential of charge detecting section 113 to a predetermined level during a feed-through interval.

Next, the operation of the first conventional solid state image pick-up device will be described below with reference to FIGS. 3A to 3G. A pixel period is constituted of the reset interval t1 during which the charge stored in the charge detecting section 113 is ejected, the feed-through interval t2 during which the charge detecting section 113 is set to the predetermined level, and the signal charge interval t3 during which the charge is injected from the horizontal transfer section 111 to the charge detecting section 113. The drive circuits 102 also generates the reset signal $\phi R$ as shown in FIG. 3A and the driving signals $\phi H_1$ and $\phi H_2$ as shown in FIGS. 3C and 3B such that these signals becomes active or high for every pixel period. The signals $\phi H_1$ and $\phi H_2$ are opposite in phase to each other. The reset signal is supplied to the reset transistor 114 and the driving signals $\phi H_1$ and $\phi H_2$ are supplied to the electrodes of the horizontal transfer section 111. Since the signals $\phi H_1$ and $\phi H_2$ are alternately activated, the charge of each pixel is transferred toward the output gate 112. During the reset interval t1, the charge stored in the charge detecting section 113 is ejected to the reset drain terminal 115 through the reset transistor 114 in response to the reset signal $\phi R$, so that an output signal Sa of the output amplifier 116 rises upward as shown in FIG. 3D. When the reset signal is inactive, the output amplifier sets the charge detecting section 113 to a predetermined potential during the feed-through interval t2. As a result, the output signal Sa is flat during the interval t2 as shown in FIG. 3D. During the signal charge interval t3, the output gate 112 of the horizontal transfer section 111 is turned on in response to an output gate signal OG from the drive circuit 102, so that the charge of a pixel is injected to the capacitor of the charge detecting section 113. As a result, the potential of capacitor $C_{FJ}$ whose other terminal is connected to the ground potential is decreased and the output signal Sa also goes down.

The output signal Sa amplified by the output amplifier 116 in the CCD section 101 is continuously outputted to one terminal of the delay circuit 104 through the buffer circuit 103 as a signal SA. The other terminal of the delay circuit 104 is connected to the ground potential. The signal SA incident to the delay circuit 104 at the one terminal is reflected by the other terminal and returned to the one terminal as a signal SB as shown in FIG. 3E. As seen from the figure, the delay time of the delay circuit 104 is a time period corresponding to the feed-through interval t2. The incident signal SA and the reflected signal SB are continuously and differentially synthesized or summed to produce a signal Sc. The signal Sc is supplied the gate circuit 106 through the emitter follower 105 as a signal SC as shown in FIG. 3F. The signal SC represents a differential signal between the feed-through interval t2 and the signal charge interval t3. The gate circuit 106 extracts an element of the signal SC during the signal charge interval in response to the sampling signal G from the pulse generating circuit 107 as shown in FIG. 3G. As seen the figure, the sampling signal G is activated once for every pixel period. Thereby, noise such as reset noise during the reset interval t1 and 1/f noise generated in the output amplifier of the CCD section 101 can be reduced.

In such a solid state image pick-up device, as a method of improving the sensitivity under dark illumination, there is well known a method of sequentially adding in the charge detecting section 113, the signal charges for a plurality of pixels in the horizontal direction of the CCD section 101 over a plurality of pixel periods. In this case, the degradation of sensitivity can be prevented by adding the signal charges for the plurality of pixels but the resolution is degraded. That is, there is the relation of trade-off between the resolution and the increase of sensitivity.

FIG. 4 is a block diagram of a second conventional solid state image pick-up device in which the signal charges for a plurality of pixels are sequentially added. In the second conventional solid state image pick-up device, a circuit for improving the sensitivity under dark illumination is added to the first conventional image pick-up device. The circuit includes a second delay circuit 108 in which the delay time is t2+(one pixel period, i.e., t1+t2+t3), and a switch 109 for switching between the delay circuits 104 and 108.

In the second conventional solid state image pick-up device under bright illumination, the signal charge is injected from the horizontal transfer section 111 to the charge detecting section 113 for every pixel period. Accordingly, if the delay circuit 104 is connected to the output of buffer circuit 103 by the switch 109, the same circuit structure as shown in FIG. 1 is accomplished. In this case, the reset signal φR is supplied to the gate of transistor 114 for every pixel period such that the charge in the charge detection section 113 is ejected to the set drain terminal 115. On the other hand, in a case of dark illumination, the delay circuit 108 is connected to the output of buffer circuit 103 by the switch 9. In this case, the signal charge is injected from the horizontal transfer section 111 to the charge detecting section 113 for every pixel period and the reset signal φR is supplied to the gate of transistor 114 for every two pixel periods so that the signal charges for two pixels are summed in the charge detecting section 113, resulting in an output signal having a high S/N ratio. However, in the second conventional solid state image pick-up device, the delay circuit 108 must delay the high frequency signal SA for a long time. Further, there is required a high frequency signal switch for switching between the delay circuits 104 and 108 depending upon the illumination. Further, there is a problem of the increased size of peripheral circuit and impedance mismatch.

SUMMARY OF THE INVENTION

An object of present invention is to provide a method for improving the S/N ratio of an image signal under dark illumination and to provide a solid state image pick-up device for the method.

Another object of the present invention is to provide a method of integratedly treating the signal charges of a plurality of pixels (and to provide a solid state image pick-up device for the method) without adding a special circuit for a high frequency circuit.

In order to achieve an aspect of the present invention, a solid state image pick-up device, includes a signal generating unit for generating a reset signal and a transfer signal, a charge detecting section having a capacitor for storing a charge, a charge transfer section for outputting charges of n pixels (n is a positive integer more than 1) to the capacitor of the charge detecting section at a time in response to the transfer signal, a reset unit connected to the capacitor, for ejecting the charge from the capacitor of the charge detecting section in response to the reset signal, and an output amplifier unit for producing an output signal in response to the charges inputted from the charge transfer section to the capacitor of the charge detecting section.

One pixel period is composed of a charge ejection interval, a potential setting interval and a charge injection interval, and the signal generating unit supplies the reset signal to the reset unit in the charge ejection interval, and the transfer signal to the horizontal transfer section in the charge injection interval, and the output amplifier unit operates to set the charge detecting section to a predetermined potential in the potential setting interval after the charge ejection interval and before the charge injection interval.

An output control signal of the transfer signal is supplied to the charge transfer section in the charge injection interval of the last one of n pixel periods so that the charges of n pixels is injected to the capacitor of the charge detecting section. Accordingly, any charge is not transferred to the capacitor before the last pixel period. For this purpose, the charge transfer section may include a final electrode and a plurality of electrodes sequentially arranged from the final electrode. In this case, the plurality of electrodes operates to transfer the charge of each pixel toward the final electrode in response to a set of clock signals of the transfer signal from the signal generating unit, and the final electrode stores the charges of n pixels during the n pixel periods and outputs the stored charges to the capacitor in response to an output control signal of the transfer signal.

The solid state image pick-up device may further include a switch for selectively supplying one of one of the set of clock signals and the output control signal to the final electrode. If the switch is manually switched, the sensitivity can be arbitrarily selected. Also, the solid state image pick-up device may further include an illumination detector for detecting an illumination around the solid state image pick-up device, and controlling the switch to supply the output control signal to the final electrode when the detected illumination is lower than a predetermined level and to supply the one of the set of clock signals to the final electrode when the detected illumination is higher than the predetermined level. In this case, the sensitivity can be automatically selected.

The solid state image pick-up device according to the present invention may be added with a noise reducing unit for reducing noise in the output signal from the output amplifier unit, such as a reflection delay difference type of noise reducing circuit. Preferably, the noise reducing unit includes a delaying and differential unit for delaying the output signal as an incident signal by one interval, each pixel period being composed of three intervals, and for summing the incident and the delayed signal, and a sampling unit responsive to a sampling signal, for extracting a signal element corresponding to one of the three intervals in which the charges of n pixels are injected to the capacitor. The signal generating unit generates the sampling signal once for n pixel periods to supply to the sampling unit.

In order to achieve another aspect of the present invention, a method of producing a noise-reduced and S/N-enhanced signal under low illumination in a solid state image pick-up device, comprising the steps of:

ejecting charge from a charge detecting section during a charge ejecting interval;

setting the charge detecting section to a predetermined potential during a potential setting interval after the charge ejecting interval;

storing charges of n pixels (n is a positive integer more than 1) during n pixel periods and injecting the stored charges into the charge detecting section during a charge injecting interval of the last one of the n pixel periods after the potential setting period; and detecting a potential of the charge detecting section to produce an output signal.

BRIEF DESCRIPTION OF THE DRAWINGS

FIGS. 6A through 6H are timing charts for explaining the operation of the solid state image pick-up device of the present invention shown in FIG. 5.

DESCRIPTION OF THE PREFERRED EMBODIMENTS

The solid state image pick-up device according to the present invention will be described in detail with reference to the accompanying drawings.

Figure 1:
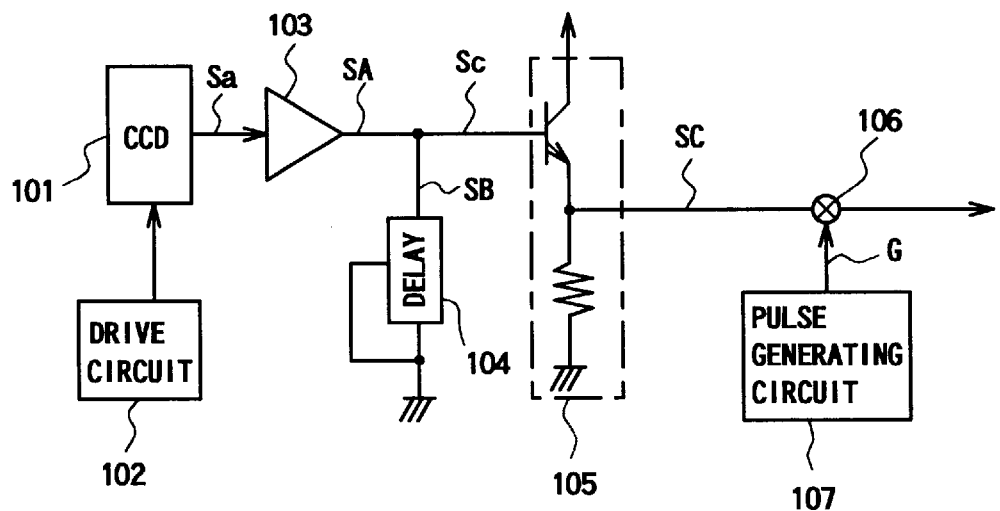
FIG. 1 is a block diagram of a first conventional solid state image pick-up device.
Figure 2:
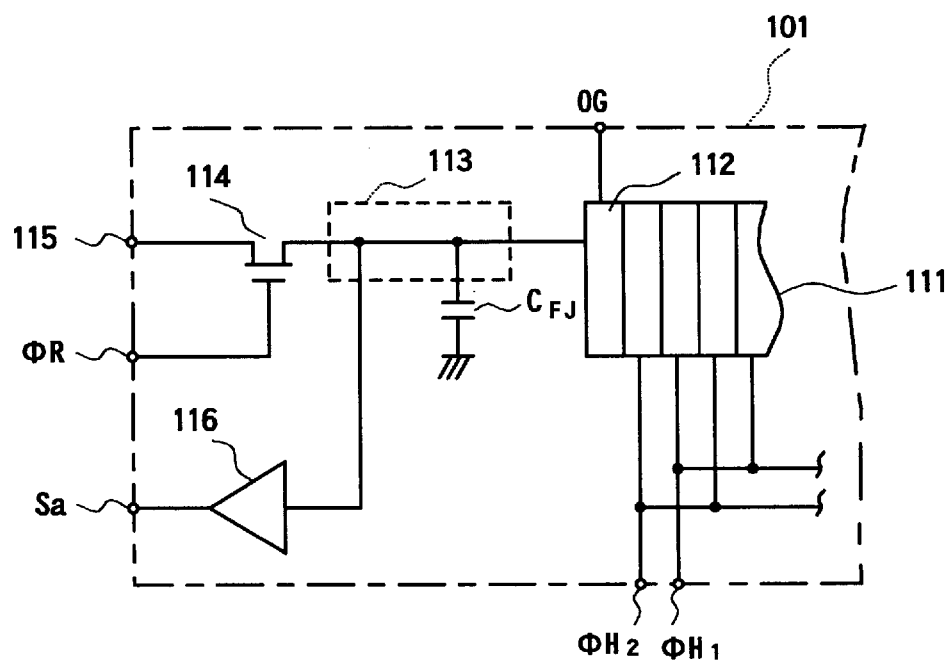
FIG. 2 is a block diagram of a CCD section 101 shown in FIG. 1.
Figure 3:
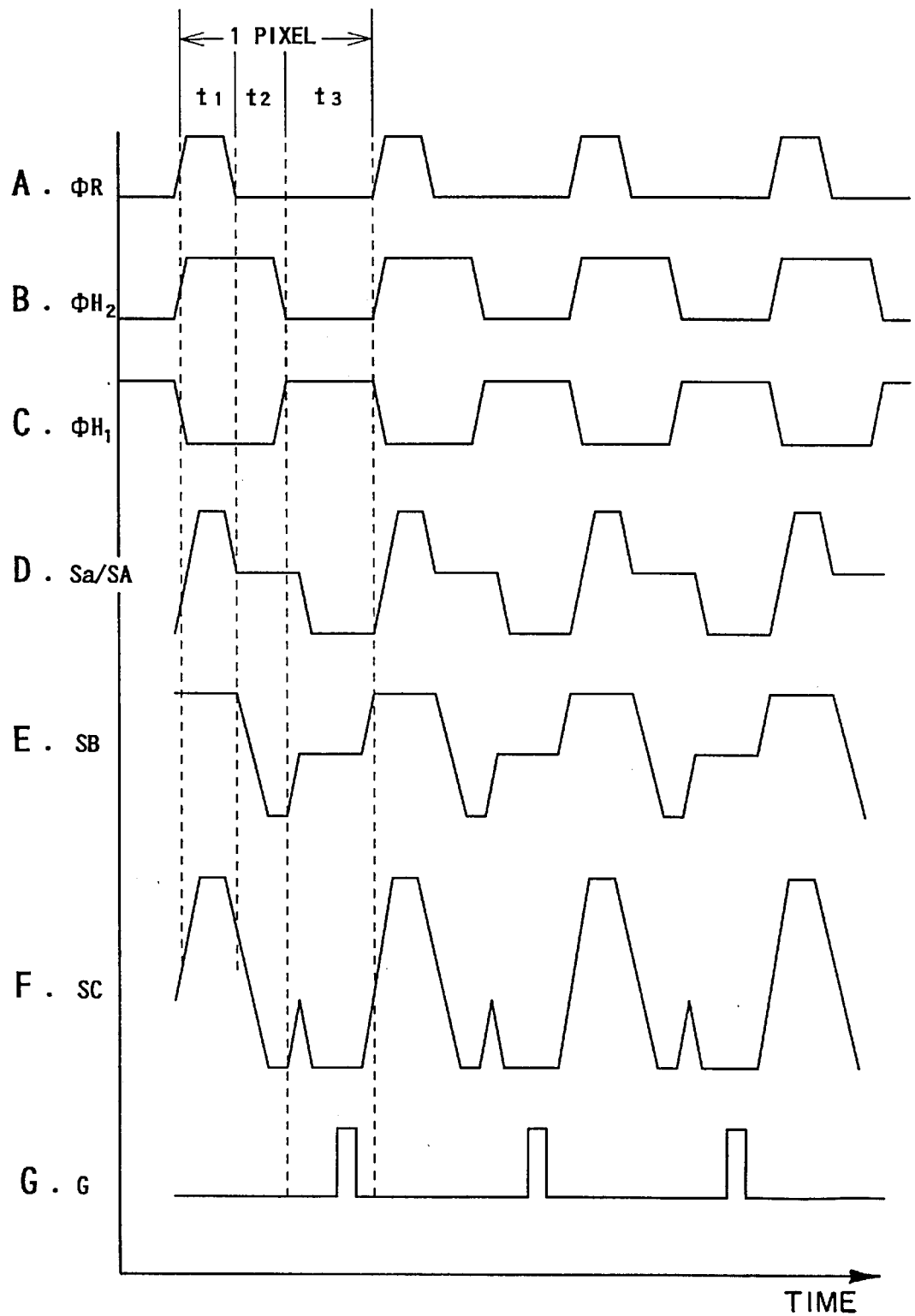
FIGS. 3A through 3G are timing charts for explaining the operation of the first conventional solid state image pick-up device shown in FIG. 1.
Figure 4:
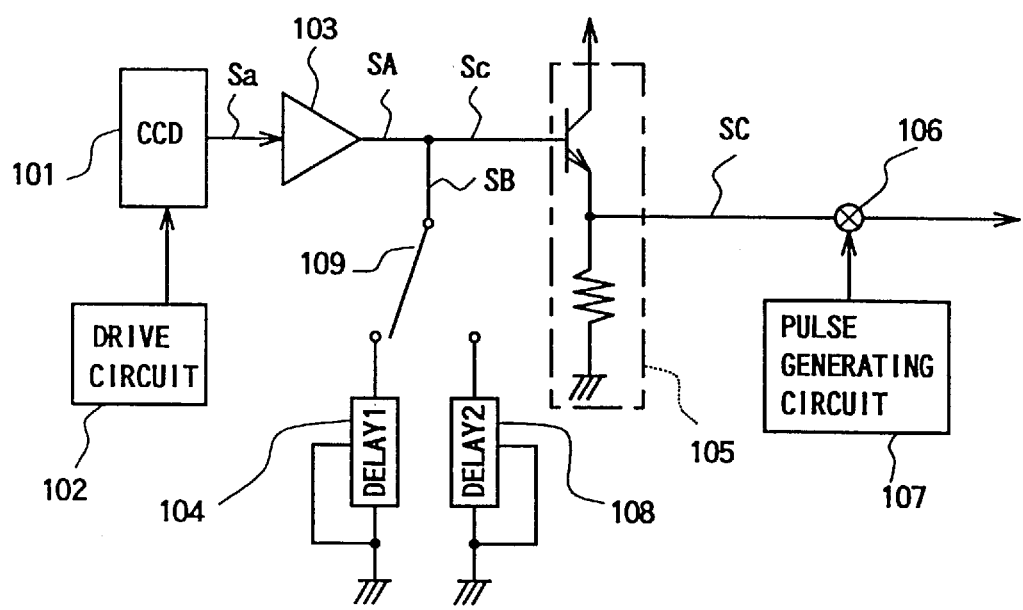
FIG. 4 is a block diagram of a second conventional image pick-up device.
Figure 5:
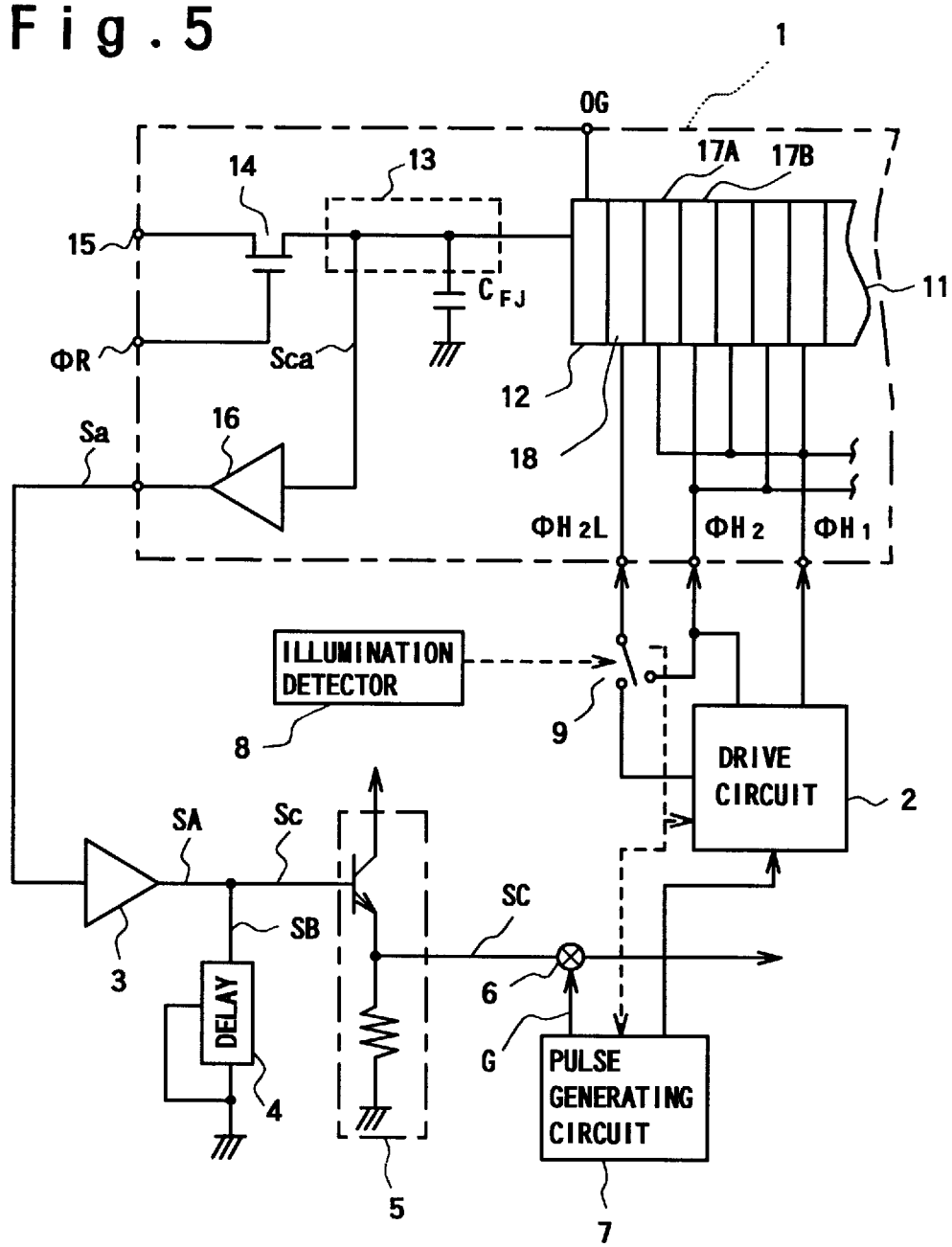
FIG. 5 is a block diagram of a solid state image pick-up device according to an embodiment of the present invention.

FIG. 5 is a block diagram showing the solid state image pick-up device according to an embodiment of the present invention. Referring to FIG. 5, this image pick-up device includes a CCD section 1. The CCD section 1 includes a plurality of light receiving sections (not shown) arranged in a matrix manner for each converting incident a light signal into a signal charge. Each light receiving section corresponds to a pixel. The CCD section 1 further includes a plurality of vertical transfer sections (not shown) each provided for a column of the light receiving sections, and a horizontal transfer section 11 for receiving the signal charges from light receiving section through the vertical transfer sections to transfer the signal charges during a horizontal scanning period in response to the transfer signal $\phi H_1$, $\phi H_2$ and $\phi H_2 L$. The horizontal transfer section 11 is constructed so that two types of electrodes 17A and 17B are alternately arranged and supplied with clock signals $\phi H_1$ and $\phi H_2$ of the transfer signal. The horizontal transfer section 11 further includes an output gate 12 for allowing the signal charges to be outputted in response to an output gate signal OG, and a final electrode 18 provided between the output gate 12 and the end one 17A of the alternately arranged electrodes. The final electrode 12 operates in response to an output control signal $\phi H_2 L$ of the transfer signal. Each electrode 17A, 17B or 18 forms a potential well in response to a high level of the signal $\phi H_1$, $\phi H_2$ or $\phi H_2 L$ to store charge and ejects the stored charge in response to a low level of the signal $\phi H_1$, $\phi H_2$ or $\phi H_2 L$. The CCD section 1 further includes a charge detecting section or floating diffusion layer 13 having a capacitor $C_{FJ}$ which stores a charge transferred from the horizontal transfer section 11, and a reset transistor 14 for ejecting the charge stored in the charge detecting section 13 to a reset drain terminal 15 in response to a reset signal $\phi R$ supplied to the gate of the transistor through a reset signal terminal. An output amplifier 16 detects the potential of charge detecting section 13 to output the output signal Sa in accordance with the detecting result. Also, the output amplifier 16 sets the potential of charge detecting section 13 to a predetermined level during a feed-through interval.

The solid state image pick-up device according to the present invention further includes a driving circuit 102 for generating the transfer signal $\phi H_1$, $\phi H_2$ and $\phi H_2 L$, the reset signal $\phi R$, and the output gate signal OG in response to a clock signal from a pulse generating circuit 7 to drive the CCD section 1, a buffer circuit 3 for receiving the output signal Sa from the CCD section 1 to produce a signal SA, and a delay circuit or delay line 4 having one of terminals as an input terminal connected to the buffer circuit 3 and the other terminal (an end terminal) connected to the ground potential. The signal SA incident to the input terminal of the delay circuit 4 travels in the delay circuit 4 and is reflected at the end terminal to be returned to the input terminal as a reflected signal SB. The delay time from when the signal SA is inputted to the input terminal to when the reflected signal SB is returned to the input terminal is substantially equal to a feed-through interval (to be described below in detail). The signal SA and the reflected signal SB are differentially summed at the input terminal of the delay circuit 4 to produce a signal Sc.

The solid state image pick-up device further includes an emitter follower circuit 5 for receiving the summed signal Sc from the delay circuit 4, a gate circuit 6 for determining or sampling a voltage difference between a signal charge interval and the feed-through interval of the output signal SC from the emitter follower circuit 5 in response to a sampling signal G, and a pulse generating circuit 7 for supplying the sampling signal G to the gate circuit 6.

The solid state image pick-up device further includes an illumination detector 8 and a switch 9. The illumination detector 8 detects illumination around the image pick-up device. When the illumination is detected to be dark, the switch 9 operates to connect the signal $\phi H_2 L$ to the final electrode 12 and when the illumination is detected to be bright, the switch 9 operates to connect the signal $\phi H_2$ to the final electrode. The drive circuit 2 operates to generates the output gate signal OG based on the switching state of the switch 9 such that it is activated during the interval t6 once for every six intervals when the signal $\phi H_2 L$ is supplied to the final electrode. Also, the pulse generating circuit 7 operates to generates the sampling signal G based on the switching state of the switch 9 such that it is activated during the interval t6 once for every six intervals when the signal $\phi H_2 L$ is supplied to the final electrode.

Next, the operation of the first conventional solid state image pick-up device will be described below with reference to FIGS. 6A to 6H, when the illumination is detected to be dark by the detector 8. In the present invention, two light receiving sections or two pixel are handled as one pixel. That is, one pixel period is constituted of two conventional pixel periods. For this reason, in the embodiment, one pixel period is divided six intervals t1 through t6, that is, the reset intervals t1 and t4 during which the charge stored in the charge detecting section 13 is ejected, the feed-through intervals t2 and t4 during which the charge detecting section 13 is set to the predetermined level, and the signal charge intervals t3 and t6 during which the charge is injected from the horizontal transfer section 11 to the charge detecting section 13.

The drive circuits 2 generates the reset signal φR for every three intervals as shown in FIG. 6A and the driving signals φH$_1$, φH$_2$ and φH$_2$L as shown in FIGS. 6B to 6D. The signals φH$_1$ and φH$_2$ are opposite in phase to each other and are active or in a high level during the intervals t2 and t5 once for every three intervals. On the other hand, the signal φH$_2$L is active during the intervals t2 to t5 one for every pixel period. The reset signal φR is supplied to the reset transistor 14 and the signals φH$_1$, φH$_2$ and φH$_2$L are supplied to the electrodes of the horizontal transfer section 11. Since the signals φH$_1$ and φH$_2$ are alternately activated, the charge from each light receiving section is transferred toward the output gate 12. During the reset interval t1, the charge stored in the charge detecting section 13 is ejected to the reset drain terminal 15 through the reset transistor 14 in response to the reset signal φR, so that an output signal Sa of the output amplifier 16 rises upward as shown in FIG. 6F. When the reset signal is inactive, the output amplifier sets the charge detecting section 13 to a predetermined potential during the feed-through interval t2. As a result, the output signal Sa is flat during the interval t2 as shown in FIG. 6E. However, since any charge is not supplied to the charge detecting section 13 during the interval t3, the potential of charge detecting section 13 is kept constant. During the intervals t4 and t5, the above operation is repeated. That is, the reset signal φR is again supplied to the reset transistor 4 and the charge receiving section 13 is set to the predetermined potential. On the other hand, in the transfer section 11, a potential well is formed under the final electrode 12 in response to the signal φH$_2$L and the signal charges transferred in response to the signals φH$_1$ and φH$_2$ are stored in the potential well formed under the final electrode 12.

During the signal charge interval or charge injection interval t6, since the output gate 12 of the horizontal transfer section 11 is turned on in response to an output gate signal OG from the drive circuit 2 and the signal φH$_2$L supplied to the final electrode 12 change to a low level (an inactive state), the signal charges of two light receiving sections are injected to the capacitor C$_{FJ}$ of the charge detecting section 13. As a result, the potential of capacitor C$_{FJ}$ whose other terminal is connected to the ground potential is decreased and the output signal Sa also goes down as shown in FIG. 6E.

The output signal Sa amplified by the output amplifier 16 in the CCD section 1 is continuously outputted to one terminal of the delay circuit 4 through the buffer circuit 3 as a signal SA. The other terminal of the delay circuit 4 is connected to the ground potential. The signal SA incident to the delay circuit 4 at the one terminal is reflected by the other terminal and returned to the one terminal as a signal SB as shown in FIG. 6F. As seen from the figure, the delay time of the delay circuit 4 is a time period corresponding to the feed-through interval t2 or t4. The delay time needs not to be a long time, i.e., an interval t2+t1+t2+t3, unlike the second conventional image pick-up device. The incident signal SA and the reflected signal SB are continuously and differentially synthesized or summed to produce a signal Sc. The signal Sc is supplied the gate circuit 6 through the emitter follower 5 as a signal SC as shown in FIG. 6G. The signal SC represents a differential signal between the feed-through interval t4 and the signal charge interval t6. The gate circuit 6 extracts an element of the signal SC during the signal charge interval in response to the sampling signal G from the pulse generating circuit 7 as shown in FIG. 6H. As seen the figure, the sampling signal G is activated once for every pixel period. Thereby, noise such as reset noise during the reset interval t1 and 1/f noise generated in the output amplifier of the CCD section 1 can be reduced and the sensitivity can be increased with an S/N ratio improved.

When the illumination is detected to be bright by the detector 8, the operation of the solid state image pick-up device is the same as that of the first conventional image pick-up device described with reference to FIGS. 3A to 3G.

In the above embodiment, the detector 9 may be omitted. In this case, the switch 9 may be operated manually.

What is claimed is:

1. A solid state image pick-up device, comprising:
   signal generating means for generating a reset signal, a transfer signal, and a sampling signal;
   a charge detecting section having a capacitor for storing a charge;
   a charge transfer section including a final section and a plurality of sections sequentially arranged from said final section, for storing charges of n pixels (n is a positive integer more than 1) in said final section during n pixel periods and outputting the stored charges to said capacitor of said charge detecting section at a time in response to the transfer signal;
   reset means connected to said capacitor, for ejecting charge from said capacitor of said charge detecting section in response to the reset signal;
   amplifier means for producing an output signal in response to the charges inputted from said charge transfer section to said capacitor of said charge detecting section; and
   noise reducing means for reducing noise in the output signal from said amplifier means to extract the noise-reduced signal in response to the sampling signal; and
   wherein said noise reducing means comprises:
      delaying and differential means for delaying the output signal as an incident signal by one interval, each pixel period being composed of three intervals of a charge ejecting interval, a potential setting interval and a charge injection interval, and for differentially summing the incident signal and the delayed signal; and
      sampling means responsive to the sampling signal, for extracting the summed signal of the charge injection interval to produce the noise-reduced signal, and
      wherein said signal generating means generates the sampling signal once for the n pixel periods in the charge injection interval of the last one of the n pixel periods to supply to said sampling means.

2. The solid state image pick-up device according to claim 1, wherein said signal generating means generates, as the transfer signal, a set of clock signals for every pixel period and an output control signal in the charge injection interval of the last one of the n pixel periods and said final section of said charge transfer section injects the stored charges of n pixels to said capacitor of said charge detecting section in response to the output control signal.

3. The solid state image pick-up device according to claim 2, further comprising a switch for selectively supplying one of one of the set of clock signals and the output control signal to said final section, and said signal generating means generates the sampling signal once for every pixel period when the one of set of clock signals is supplied to said final section.

4. A method of producing a noise-reduced and S/N-enhanced signal under low illumination in a solid state image pick-up device, comprising the steps of:

ejecting charge from a charge detecting section during a charge ejecting interval;

setting said charge detecting section to a predetermined potential during a potential setting interval after the charge ejecting interval;

storing charges of n pixels (n is a positive integer more than 1) during n pixel periods and injecting the stored charges into said charge detecting section during a charge injecting interval of the last one of the n pixel periods after the potential setting period; and detecting a potential of said charge detecting section to produce an output signal; and delaying the output signal by a time period corresponding to the potential setting interval by reflecting the output signal;

differentially summing the output signal and the delayed signal; and extracting the summed signal of the charge injection interval of the last one of the n pixel periods to produce the noise-reduced signal.

5. The method according to claim 4, further comprising the step of generating, as a transfer signal, a set of clock signals for every pixel period to supply to a plurality of sections of a charge transfer section such that the charges are transferred toward a final section, and an output control signal in the charge injection interval of the last one of the n pixel periods to supply to said charge transfer section such that said final section stores the charges of n pixels and injects the stored charges of n pixels to said charge detecting section in response to the output control signal.

6. The method according to claim 5, further comprising the step of switching the signal to be supplied to said final section from one of the set of clock signals to the output control signal.

7. A solid state image pick-up device, comprising:

signal generating means for generating a reset signal and a transfer signal;

a charge detecting section having a capacitor for storing a charge;

a charge transfer section for outputting charges of n pixels (n is a positive integer more than 1) to said capacitor of said charge detecting section at a time in response to the transfer signal;

reset means connected to said capacitor, for ejecting the charge from said capacitor of said charge detecting section in response to the resent signal; and output amplifier means for producing an output signal in response to the charges inputted from said charge transfer section to said capacitor of said charge detecting section; and wherein one pixel period is composed of a charge ejection interval, a potential setting interval and a charge injection interval, and wherein said signal generating means supplies the reset signal to said reset means in the charge ejection interval, and the transfer signal to said horizontal transfer section in the charge injection interval, and wherein said output amplifier means operates to set said charge detecting section to a predetermined potential in the potential setting interval after the charge ejection interval and before the charge injection interval.

8. The solid state image pick-up device according to claim 7, wherein an output control signal of said transfer signal is supplied to said charge transfer section in the charge injection interval of the last one of n pixel periods to allow the charges of n pixels to be injected to said capacitor of said charge detecting section.

9. A solid state image pick-up device, comprising:

signal generating means for generating a reset signal and a transfer signal;

a charge detecting section having a capacitor for storing a charge;

a charge transfer section for outputting charges of n pixels (n is a positive integer more than 1) to said capacitor of said charge detecting section at a time in response to the transfer signal;

reset means connected to said capacitor, for ejecting the charge from said capacitor of said charge detecting section in response to the reset signal; and output amplifier means for producing an output signal in response to the charges in putted from said charge transfer section to said capacitor of said charge detecting section; and wherein said charge transfer section includes a final electrode and a plurality of electrodes sequentially arranged from said final electrode, and wherein said plurality of electrodes operates to transfer the charge of each pixel toward said final electrode in response to a set of clock signals of said transfer signal from said signal generating means, and wherein said final electrode stores the charges of n pixels during the n pixel periods and outputs the stored charges to said capacitor in response to an output control signal of said transfer signal.

10. The solid state image pick-up device according to claim 9, further comprising a switch for selectively supplying one of one of the set of clock signals and the output control signal to said final electrode.

11. The solid state image pick-up device according to claim 10, further comprising an illumination detector for detecting an illumination around the solid state image pick-up device, and controlling said switch to supply the output control signal to said final electrode when the detected illumination is lower than a predetermined level and to supply the one of the set of clock signals to said final electrode when the detected illumination is higher than the predetermined level.

12. A solid state image pick-up device, comprising:

signal generating means for generating a reset signal and a transfer signal;

a charge detecting section having a capacitor for storing a charge;

a charge transfer section for outputting charges of n pixels (n is a positive integer more than 1) to said capacitor of said charge detecting section at a time in response to the transfer signal;

reset means connected to said capacitor, for electing the charge from said capacitor of said charge detecting section in response to the reset signal; and output amplifier means for producing an output signal in response to the charges inputted from said charge transfer section to said capacitor of said charge detecting section;

noise reducing means for reducing noise in the output signal from said output amplifier means; and wherein said noise reducing means comprises;

delaying and differential means for delaying the output signal as an incident signal by one interval, each pixel period being composed of three intervals, and for summing the incident and the delayed signal; and sampling means responsive to a sampling signal, for extracting a signal element corresponding to one of the three intervals in which the charges of n pixels are injected to said capacitor, and wherein said signal generating means further generates the sampling signal once for n pixel periods to supply to said sampling means.

* * * * *